Patented July 5, 1938

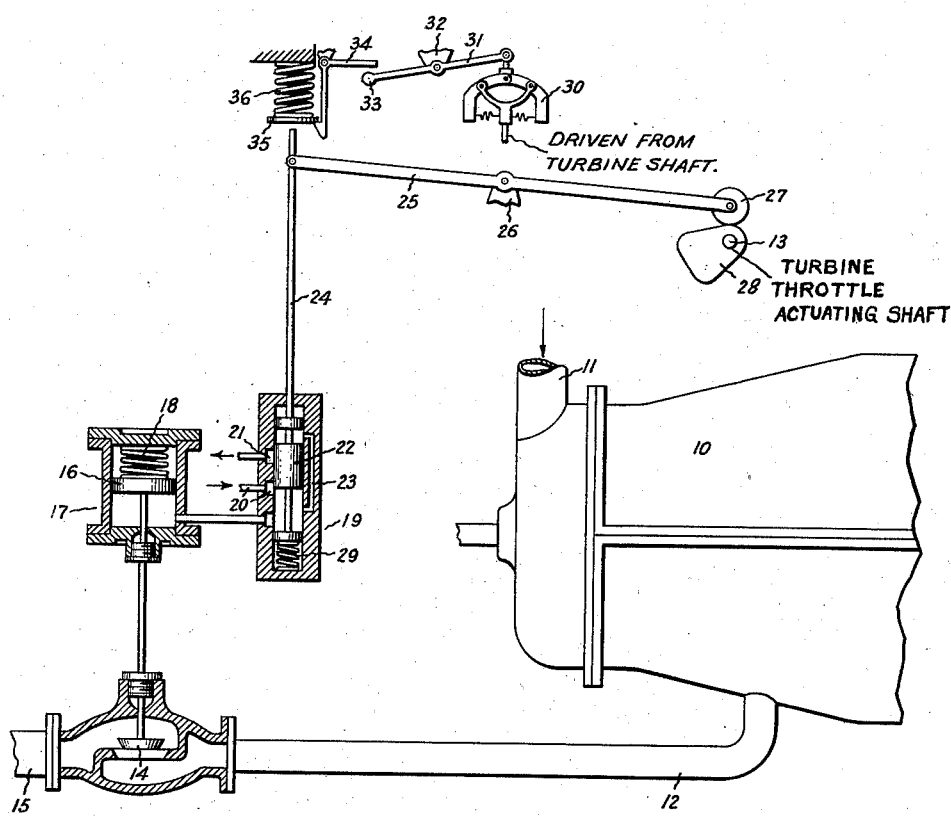

2,123,064

UNITED STATES PATENT OFFICE 2,123,064

EXTRACTION TURBINE ARRANGEMENT

Arthur Rosch, Brieselang, near Nauen, Germany, assignor to General Electric Company, a corporation of New York Application May 11, 1937, Serial No. 141,996
In Germany October 30, 1936

3 Claims. (Cl. 60—67)

The present invention relates to extraction turbine arrangements, more specifically to the type of extraction turbines in which the flow of extraction fluid through the extraction conduit is uncontrolled. It has been customary to provide a throttle valve in the extraction conduit to reduce pressure fluctuations of the extraction fluids discharged therefrom. If such extraction turbine is used in conjunction with a system subject to considerable load fluctuations, that is, changes in demand for mechanical load output from the turbine, as is often the case when the turbine is arranged to drive a generator connected to an electric line, it becomes desirable to reduce the flow of extraction fluid, preferably completely to close the throttle valve in said conduit in response to certain load conditions.

The object of my invention is to provide an improved extraction turbine arrangement whereby the throttle valve in the extraction conduit is shut upon a certain increase in demand for mechanical load output from the extraction turbine. With the closing of the extraction throttle valve, all of the elastic fluid is passed from the extraction stage through the lower stages and the mechanical load output of the lower stages accordingly increased. The closing of the throttle valve upon a certain load increase may be accomplished in various ways, for instance, in response to the opening of the turbine inlet valves or in response to changes in load or turbine speed.

For a better understanding of what I believe to be novel and my invention, attention is directed to the following description and the claims appended thereto in connection with the accompanying drawing.

The single figure of the drawing shows an extraction turbine arrangement embodying my invention.

The arrangement comprises an extraction turbine 10 having an inlet conduit 11 and an extraction conduit 12. The flow of elastic fluid through the inlet conduit 11 to the turbine is controlled in known manner by valve means, not shown, which valve means are positioned by means including a cam or control shaft 13 such that a certain position of the control shaft corresponds to a certain position of the admission valves and accordingly a certain flow of elastic fluid to the turbine. The extraction conduit 12 includes a throttle valve 14 which is normally held in an intermediate position to maintain substantially constant the pressure in a discharge conduit 15 receiving fluid from the extraction conduit 12.

In accordance with my invention means are provided for automatically closing the throttle valve 14 upon the occurrence of certain conditions. In the present instance the stem of the throttle valve 14 is connected to a piston 16 of a hydraulic motor 17. The piston is biased in downward direction by a compression spring 18. Actuating fluid under pressure is supplied to the lower part of the hydraulic motor cylinder by means of a pilot valve 19 which has an inlet port 20 and a discharge port 21. The flow of actuating fluid through these ports is controlled by a pilot valve head 22. In the position indicated, actuating fluid may be supplied through the inlet port 20 of the pilot valve to the hydraulic motor 17. When the pilot valve head 22 is moved downward to uncover the discharge port 21 and to cover the inlet port 20, then actuating fluid is discharged from the hydraulic motor 17 through the discharge port 21 of the pilot valve. Communication between the discharge port 21 and the hydraulic cylinder is established by means including a bypass 23 in the pilot valve cylinder. The head 22 of the pilot valve is secured to a stem 24 which in turn is pivotally connected to the left-hand end of a lever 25. The latter has an intermediate point supported on a fulcrum 26 and a right-hand end with a roller 27 in engagement with a cam 28 on the turbine control shaft 13. The roller 27 is forced into engagement with the cam 28 by means of a compression spring 29 provided at the lower end of the pilot valve. As pointed out above, the position of the turbine control shaft corresponds to the position of the turbine inlet valves and accordingly is a measure of the flow of elastic fluid to the turbine.

During operation the control shaft 13 is rotated in clockwise direction to increase the flow of elastic fluid to the turbine. As the flow of fluid to the turbine reaches a certain maximum value the roller 27 is forced upward by the cam 28 and thereby causes downward movement of the pilot valve head 22 to effect discharge of the fluid from the lower end of the hydraulic motor 17, resulting in closing movement of the throttle valve 14.

If load is suddenly thrown off from the extraction turbine it also becomes desirable to close the throttle valve because the pressure in the extraction stage under such condition is considerably reduced which would permit back flow of fluid in the extraction conduit 12. This is accomplished in accordance with my invention by the provision of a safety governor 30 which is driven from the turbine shaft and pivotally connected to the right-hand end of a lever 31 which has an intermediate point held on a fulcrum 32 and a left-hand end 33 in cooperative relation with a latch 34. The latch 34 normally engages a plate 35 secured to the lower end of a spring 36 and holding such spring in compressed condition. The spring plate 35 is arranged in proximity to the upper end of the pilot valve stem 24.

During operation a sudden increase in speed causes through the speed governor clockwise turning movement of the lever 31 about the fulcrum 32 whereby the left-hand end 33 of the lever 31 is forced upward. As the speed reaches a certain maximum value, the left-hand end 33 engages the latch 34 and removes it from the spring plate 35. The plate thereby is forced downward into engagement with the pilot valve stem 24 and causes reversing of the pilot valve position, resulting in closing movement of the throttle valve 14.

With my invention I have accomplished an improved extraction turbine arrangement whereby a throttle valve in the extraction conduit of a turbine is normally held in a fixed opening position and automatically moved towards closing position in response to changes in mechanical load demand from the turbine beyond certain minimum and maximum values.

What I claim as new and desire to secure by Letters Patent of the United States is:

1. Extraction turbine arrangement including the combination of an extraction turbine having an extraction conduit with a throttle valve, means for normally maintaining the throttle valve in a fixed position, and means for automatically closing the throttle valve upon a sudden increase in speed and as the mechanical load demand from the turbine rises beyond a certain maximum value.

2. Extraction turbine arrangement including the combination of an extraction turbine having a valve control shaft and an extraction conduit with a throttle valve, means for normally holding the throttle valve in a certain opening position, and means for moving the throttle valve towards closing position in a certain position of the valve control shaft.

3. Extraction turbine arrangement including the combination of an extraction turbine having an extraction conduit with a throttle valve, means for normally holding the throttle valve in a fixed opening position and for automatically closing the throttle valve upon changes in mechanical load demand from the turbine beyond certain maximum and minimum values.

ARTHUR ROSCH.